Patented Dec. 13, 1932

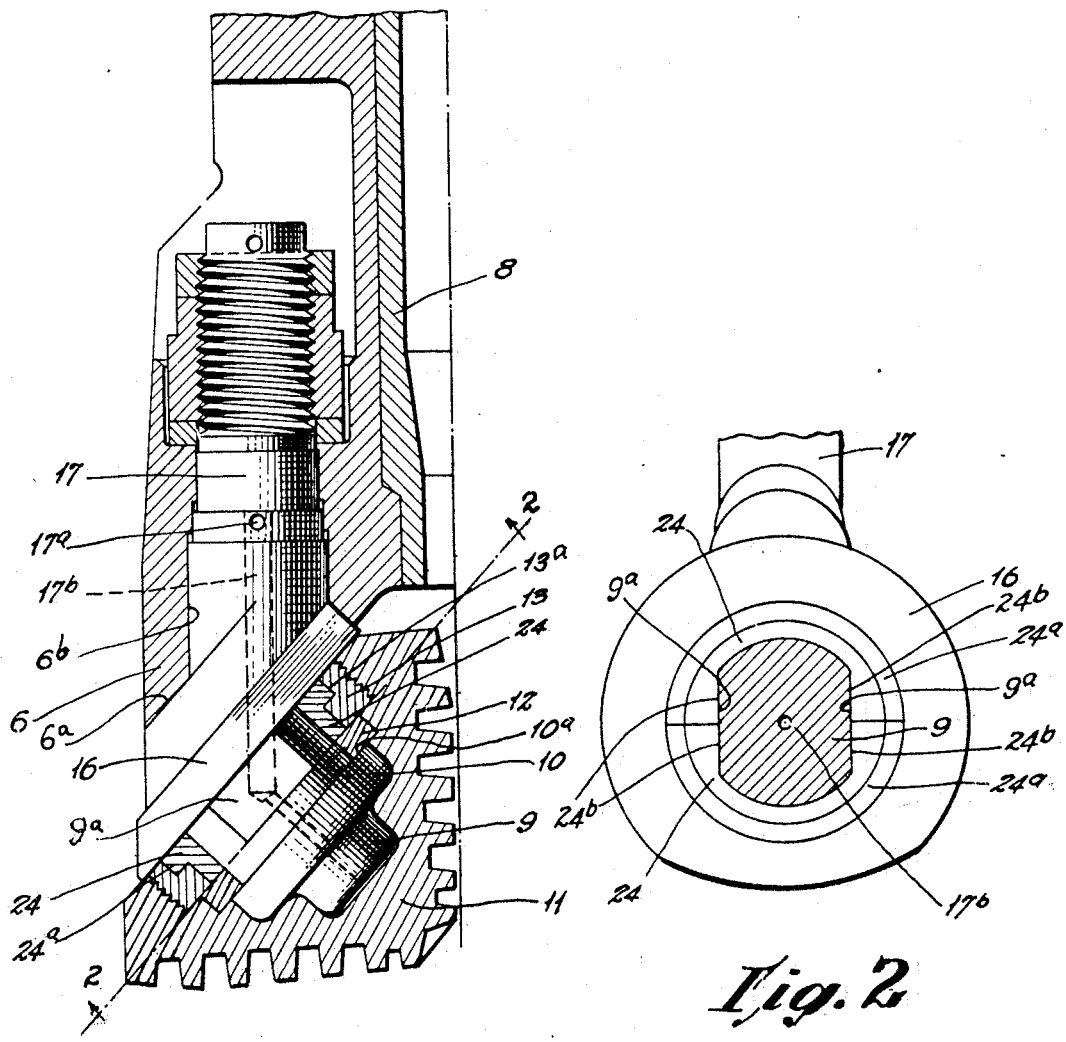

1,890,887

UNITED STATES PATENT OFFICE

CLARENCE E. REED, OF WICHITA, KANSAS, ASSIGNOR TO CHICAGO PNEUMATIC TOOL COMPANY, OF NEW YORK, N. Y., A CORPORATION OF NEW JERSEY

EARTH BORING APPARATUS

Application filed June 26, 1929. Serial No. 373,714.

This invention relates to apparatus for deep well drilling. It has been developed with particular reference to bearings, either of the fixed or removable type, upon which rotatable cutting elements are mounted.

One object of the invention is to prolong the life of a bearing member. Another object is to effect economies in the replacing of parts and to reduce the upkeep and operating expense of rotary drilling apparatus. Another object is to permit convenient renewal of the entire bearing surface, or of a worn portion of the same. Still another object is to provide segmental bearing members of identical form which are mutually interchangeable. Other objects will be apparent from the detailed description which follows.

In order to illustrate the invention one concrete embodiment thereof is shown in the accompanying drawing, in which:

Fig. 1 is a vertical sectional view through a portion of a bit head;

Fig. 2 is a front end elevational view of the shank member shown in Fig. 1 with the roller cutter and associated parts omitted, the spindle being sectioned substantially on the line 2—2 of Fig. 1.

In Fig. 1 is shown, in section, a half portion of a rotary bit head 6 provided at its lower end with an inverted V-shaped recess 7 and having a centrally disposed conduit 8 for discharging flushing fluid on the bottom of the hole which is being drilled. Head 6 has a spindle 9 projecting into the V-shaped recess 7, the spindle being substantially at right angles to the wall of the recess. Adjacent its outer or free end, spindle 9 has a radially projecting flange or enlargement 10 forming a stop shoulder 10a. A roller cutter 11, which in the present instance is cone shaped, is rotatably mounted on spindle 9, a floating segmental locking ring 12 being disposed therewithin in engagement with shoulder 10a and in turn engaged by a retainer ring 13 secured to cutter 11 as by a threaded connection. Cutter 11 and ring 13 may be pinned or otherwise locked together in any suitable manner to prevent accidental unthreading of ring 13.

While head 6 may be made in two parts with a spindle 9 integral with each part, it is preferable to use a one piece head and to form spindle 9 as a part of a separate element having a base 16 which fits in a seat recess 6a in the head and which has a shank 17 extending at an angle from base 16 and received in a socket or bore 6b in the head, in substantial parallelism with the axis of the head. Any suitable means, such as nuts 18 in engagement with the threaded end of the shank, may be provided for holding spindle 9 securely in place on the bit head. The illustrative disclosure heretofore used, conforms substantially to that of my Patent No. 1,692,793 issued November 20, 1928.

The invention involves the use of suitable replaceable bearing means for taking the wear of roller cutter 11 on spindle 9. The means shown take the form of segmental bearing members 24 surrounding spindle 9 inwardly of flange 10 and interposed between the base 16 and segmental locking ring 12. These members are flush against, or abut, base 16 and have a radially projecting flange 24a forming a step. The threaded retainer ring 13 which engages bearing members 24 is counterbored at 13a to form a cooperating step. This step arrangement takes inward thrusts of cutter 11 and by thus providing extended and angularly disposed bearing surfaces it has the still more important function of presenting an effectual barrier to the seepage of the flushing water into the cone cutter and in preventing loss of lubricant which is fed to the interior of the cutter through an oil port 17a in shank 17 and the communicating passage 17b which extends axially through the shank and thence at an angle through the spindle.

To lock the segmental bearing members 24 against rotary movement on spindle 9, any suitable or desired configuration may be given to the spindle and the bearing members are shaped to fit the same. In the present instance cooperating flats are provided on the spindle and on the bearing members. Each flat on the spindle may be arranged to be engaged entirely by the flat on one of the bearing members or by flats on both members. By preference the flats 9a on spindle 9 are vertically disposed and both are engaged by parallel flats 24b on the thick or enlarged ends of the bearing members 24. With this arrangement the split or separation in the bearing ring formed by segmental pieces 24 is horizontal, as indicated in Fig. 2, so that segmental members 24 are mutually interchangeable. Since the greater part of the wear is upon the lower side of spindle 9, it is thus possible to effect economies in upkeep and repair expense in certain instances by replacing only the lower bearing segment 24.

From the above it will be apparent that the use of replaceable bearing parts, such as segments 24, prolongs the useful life of spindle 9 or of a spindle-shank element 9, 17. The segments 24 may be conveniently made of any of the well-known special metals or alloys which are highly wear resistant. Since segments 24 are interchangeable, production costs are reduced. Repairs in the field can be quickly and cheaply made by replacing only a few inexpensive parts. The stepped arrangement of the interfitting segmental pieces 24 and retainer ring 13 greatly reduce the wear of parts by preventing seepage of flushing water on the one hand and loss of lubricant on the other.

While the invention has been herein disclosed in what is now considered to be a preferred form, it is to be understood that the invention is not restricted to the specific details thereof but covers all changes, modifications, and adaptations within the scope of the appended claims.

I claim as my invention:

1. In combination, a bit head having a spindle projecting therefrom, segmental wear members encircling at least a part of said spindle, a roller cutter on said spindle having a bearing on said members, means locking said cutter upon said spindle, and means including cooperating flats on said spindle and said members for holding the latter against rotative movement.

2. In combination, a bit head having a bearing projection for a roller cutter, said projection having an enlarged free end, segmental removable wear members on said projection, interlocking means on said projection and on said wear members to hold the latter in fixed position on said projection, a ring mounted to turn on said wear member, a roller cutter attached to said ring for rotation therewith, and locking means cooperating with said enlarged free end for retaining said cutter on said projection.

3. In combination, a bit head having a bearing projection thereon for a roller cutter, said projection having a radial stop flange, a roller cutter on said projection, a segmental locking ring surrounding said projection inwardly of said flange, a segmental bearing member on said projection inwardly of said locking ring, and a solid ring secured to said cutter engaging said locking ring and having a bearing on said bearing members, said solid ring and said member having cooperating stepped portions.

4. In combination, a bit head having a bearing projection for a roller cutter, said projection adjacent its free end being laterally enlarged, a segmental removable wear member on said projection inwardly of said enlarged portion, interfitting means on said member and on said projection to prevent turning of the former, a ring mounted to turn on said wear surface, a roller cutter attached to said ring for rotation therewith, and locking means cooperating with said enlarged free end for retaining said cutter on said projection.

5. In combination, a bit head having a bearing projection thereon for a roller cutter, said projection having a radial stop flange adjacent its outer or free end, a roller cutter on said projection, a segmental locking ring surrounding said projection inwardly of said flange, segmental bearing members on said projection inwardly of said locking ring, means holding said members in fixed position on said projection, and a retainer ring secured to said cutter engaging said locking ring and having a bearing on said bearing members, said retainer ring and said members having cooperating annular stepped portions.

6. In combination, a bit head having a bearing projection for a roller cutter, said projection having a radial stop flange adjacent its outer or free end, a roller cutter on said projection, a segmental locking ring surrounding said projection inwardly of said flange, stepped segmental bearing members on said projection inwardly of said locking ring, interfitting parts on said projection and on said members maintaining the latter against rotation, and a stepped retainer ring secured to said cutter and encircling said members with a running fit.

7. In combination, a bit head having a bearing projection, said projection having a radial stop flange adjacent its outer or free end and having a reduced portion with flats adjacent its inner end, a roller cutter on said projection, a segmental locking ring surrounding said projection inwardly of said flange, segmental bearing members on said reduced portion of said projection inwardly of said locking ring, and having flats engaging the flats on said projection, and a retainer ring secured to said cutter and encircling said members with a running fit.

8. In combination, a bit head having a bearing projection, said projection having a radial stop flange adjacent its outer or free end, and an intermediate portion between said flange and said head, said intermediate portion being circular adjacent said flange but non-circular adjacent said head, a segmental locking ring engaging the circular zone of said intermediate portion adjacent said flange, a segmental bearing ring on the non-circular zone of said intermediate portion with its bore interfitting therewith to prevent relative rotative movement, a retainer ring encircling said bearing ring with a running fit, and a roller cutter secured to said retainer ring and maintained on said projection by said locking ring.

9. In combination, a bit head having a bearing projection, said projection having a radial stop flange adjacent its outer or free end, and an intermediate portion between said flange and said head, said intermediate portion being circular adjacent said flange but non-circular adjacent said head, a segmental locking ring engaging the circular zone of said intermediate portion adjacent said flange, stepped segmental bearing members fitting the non-circular zone of said intermediate portion and held against relative rotation movement thereon, a correspondingly stepped retainer ring encircling said bearing ring with a running fit, and a roller cutter secured to said retainer ring and maintained on said projection by said locking ring.

10. A roller cutter unit for earth boring drills comprising an integrally united spindle and shank, said spindle having a radial stop flange adjacent its free end and a neck between said flange and said spindle, said neck being circular adjacent said flange but non-circular at least in part adjacent said shank, a segmental locking ring engaging the circular zone of said neck adjacent said flange, a segmental bearing ring on the non-circular zone of said neck with its bore interfitting therewith to prevent relative rotative movement, a retainer ring encircling said bearing ring with a running fit, and a roller cutter secured to said retainer ring and maintained on said spindle by said locking ring.

11. In earth boring apparatus, a supporting element for a roller cutter comprising a shank and a spindle disposed at an angle to one another and integrally united, said spindle being generally cylindrical but being reduced by a flat adjacent the shank end thereof and enlarged on its free end by a radially projecting stop flange.

12. In earth boring apparatus, a supporting element for a roller cutter comprising a base plate having a shank extending at an angle from one side thereof and a spindle extending at a right angle from the other side, said parts being integrally united, said spindle having at least one flat adjacent said base plate and an enlargement adjacent the free end thereof in the form of a radially projecting stop flange.

13. In earth boring apparatus, a supporting element for a roller cutter comprising a base plate having a shank extending at an angle from one side thereof and a spindle extending at a right angle from the other side, said parts being integrally united, said spindle having flats on diametrically opposite sides thereof and a radial stop flange adjacent the free end thereof.

14. In earth boring apparatus, a supporting element for a roller cutter comprising a base plate having a shank extending from one side at an angle and a spindle extending at a right angle from the other side, said parts being integrally united, said spindle having a radially extending stop flange having a radially extending stop flange adjacent its free end and a neck inwardly of said flange which is cylindrical adjacent said flange and reduced adjacent said plate by at least one flat in the side of said neck.

15. A semi-circular bearing member arranged for lateral application to a spindle for rotatably supporting a roller cutter, said member having a flange projecting laterally of the same and having thickened inner portions adjacent its ends providing parallel flats to interlock with the spindle.

16. In earth boring apparatus, a semi-circular bearing member arranged for lateral application to a spindle for rotatably supporting a roller cutter, said member having a circular interior terminating adjacent its ends in flat surfaces of considerable extent and in substantial parallelism for cooperation for similar flats on the spindle.

Signed by me at Wichita, in the county of Sedgwick, and State of Kansas, this 18th day of June, 1929.

CLARENCE E. REED.